(12) United States Patent
Ruzak

(10) Patent No.: US 8,260,767 B2
(45) Date of Patent: Sep. 4, 2012

(54) METHOD AND APPARATUS FOR DYNAMIC DATA BUFFER

(75) Inventor: Artem Ruzak, Sygnivka (UA)

(73) Assignee: SAP AG, Walldorf (DE)

( * ) Notice: Subject to any disclaimer, the term of this patent is extended or adjusted under 35 U.S.C. 154(b) by 643 days.

(21) Appl. No.: 11/647,742

(22) Filed: Dec. 29, 2006

(65) Prior Publication Data

US 2008/0162749 A1   Jul. 3, 2008

(51) Int. Cl.
*G06F 7/00* (2006.01)

(52) U.S. Cl. ........ 707/713; 707/717; 707/721; 709/217; 709/218; 709/219

(58) Field of Classification Search .................. None
See application file for complete search history.

(56) References Cited

U.S. PATENT DOCUMENTS

| | | | |
|---|---|---|---|
| 6,580,916 B1 * | 6/2003 | Weisshaar et al. | 455/456.1 |
| 6,954,764 B2 * | 10/2005 | Biswas et al. | 707/104.1 |
| 6,957,212 B2 * | 10/2005 | Peng | 707/3 |
| 7,058,631 B1 * | 6/2006 | Pal | 707/10 |
| 7,406,464 B2 * | 7/2008 | Kasten et al. | 1/1 |
| 2002/0057283 A1 * | 5/2002 | Biswas et al. | 345/700 |
| 2007/0156646 A1 * | 7/2007 | Komatsu et al. | 707/2 |

\* cited by examiner

*Primary Examiner* — Debbie Le
*Assistant Examiner* — Anh Tai Tran
(74) *Attorney, Agent, or Firm* — Kenyon & Kenyon LLP

(57) ABSTRACT

A dynamic data buffer method, includes providing a system for accessing a database having a plurality of fields of data potentially used by applications, analyzing an application's structure to identify at least one field of data from the plurality of fields of data in the database used by the application, performing a field-wise select for selecting only the identified at least one field of data and creating a dynamic data buffer for storing only the identified at least one field of data.

17 Claims, 7 Drawing Sheets

Figure 4

| BUFFER | | |
|---|---|---|
| 1 | | |
| 2 | | |
| 3 | | |
| 4 | | |
| 5 | | |
| 6 | | |

Figure 5

| /APO/MATKEY | | | | | |
|---|---|---|---|---|---|
| | A | B | C | D | E |
| 1 | | | | | |
| 2 | | | | | |
| 3 | | | | | |
| 4 | | | | | |
| 5 | | | | | |
| 6 | | | | | |
| 7 | | | | | |

| 1 | StrType A | $F_1 F_2 F_3 F_4 F_5$ |
|---|---|---|
| 2 | StrType B | $F_1 F_2 F_3$ |
| 3 | StrType A | $F_1 F_2 F_3 F_4 F_5$ |
| 4 | StrType C | $F_1 F_2 F_4 F_5 F_6$ |

METHOD AND APPARATUS FOR DYNAMIC DATA BUFFER

BACKGROUND

1. Technical Field

The present disclosure relates generally to data buffers and, more particularly, to a method and apparatus for dynamic data buffers.

2. Description of the Related Art

Business objects are database entries (objects) containing one or more fields that are used to represent an entity of business practice. The types of business objects an enterprise stores in their database may depend on the business endeavour of the enterprise. For example, a business engaged in the purchasing and selling of goods may store business objects such as purchase orders, invoices, sales orders, etc. The amount of data being stored these days is immense. For example, business objects may have complex structures often with huge numbers of attributes and very often, huge number of records.

The time necessary to access a database is constantly decreasing. However, database access times are still often much longer than buffer memory access times. Accordingly, in order to minimize the number of database accesses required when an application such as a business application performs is a process requiring data from a database, an object can be retrieved from the database and stored locally in buffer memory. If the data is then needed again, it can be accessed from the buffer memory so that it is not necessary to again access the database for the data.

Each object contains attributes which are used for some particular business process. In present systems, when an object is requested and loaded into memory for performing some type of calculation, for example, the entire data set is loaded into a buffer. That is, fields used for performing the business process are loaded into buffer in addition to those fields not used in the business process. This leads to the use of unnecessarily large buffer memory.

Different approaches can be used to load objects. One approach is to store data in small application-specific tables as attribute sets. Although this approach may provide certain advantages, these are far outweighed by the disadvantages of the approach. For example, when the same attributes are used in different data sets, new data sets may need to be created or complex code changes may be required.

A second approach is to store all data in one large table. One of the biggest disadvantages of this approach is that to be implemented properly, requires a large amount of buffer memory.

FIG. 2 shows an example of the second approach. In the example shown in FIG. 2, in the database /APO/MATKEY, vertical columns represent fields in the database. Horizontal rows in the database represent a line of attributes. In this example, an application request is for "select MATID, MATNR, MEINS for MATID ="1", "4", "5", "6"". In SCM Master Data Layer, for example, the system will select the data from the database and store the data in the buffer BUFFER table-wise using an instruction such as:

```
Select * FROM /apo/matkey
   INTO buffer
      WHERE matid IN ("1", "4", "5", "6")
```

Advantages of this approach are that there is no need for an artificial table split. In addition, it is able to serve all possible requests for attributes. However, disadvantages of this approach include the large use of memory for the buffer, more roundtrips per database select for data transport and unnecessary data (for this application) being read and stored.

SUMMARY

This application describes tools (in the form of methodologies, apparatuses, and systems) for dynamic data buffers. The tools may be embodied in one or more computer programs stored on a computer readable medium or program storage device and/or transmitted in the form of a computer data signal in one or more segments via a computer network or other transmission medium.

A dynamic data buffer method, includes providing a system for accessing a database having a plurality of fields of data potentially used by applications, analyzing an application's structure to identify at least one field of data from the plurality of fields of data in the database used by the application, performing a field-wise select for selecting only the identified at least one field of data and creating a dynamic data buffer for storing only the identified at least one field of data.

A dynamic data buffer system, includes a module for providing a system for accessing a database having, a plurality of fields of data potentially used by applications, a module for analyzing an application's structure to identify at least one field of data from the plurality of fields of data in the database used by the application, a module for performing a field-wise select for selecting only the identified at least one field of data and a module for creating a dynamic data buffer for storing only the identified at least one field of data.

A computer recording medium including computer executable code for providing a dynamic data buffer, includes code for providing a system for accessing a database having a plurality of fields of data potentially used by applications, code for analyzing an application's structure to identify at least one field of data from the plurality of fields of data in the database used by the application, code for performing a field-wise select for selecting only the identified at least one field of data and code for creating a dynamic data buffer for storing only the identified at least one field of data.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying, drawings, wherein:

FIG. 4 shows an example of a buffer memory according to an embodiment of the present disclosure;

FIG. 5 shows a block diagram of a database for explaining aspects of the present disclosure;

DETAILED DESCRIPTION

Figure 1:
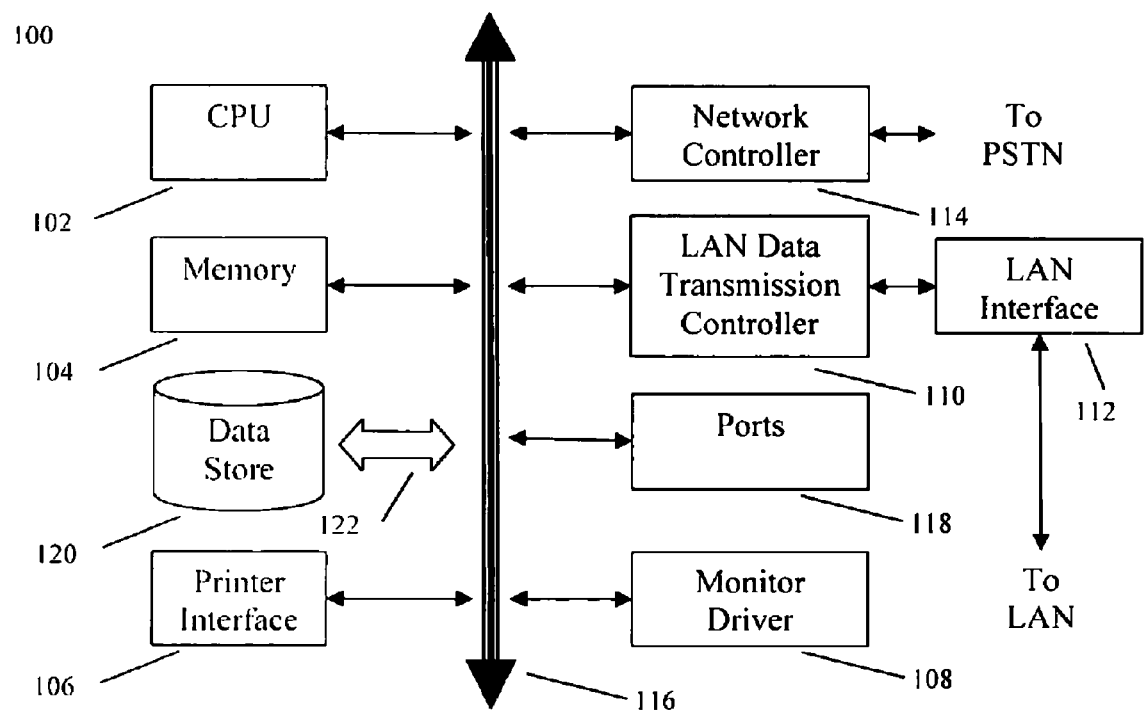
FIG. 1 shows a block diagram of an exemplary computer system capable of implementing, the method and system of the present disclosure.
Figure 2:
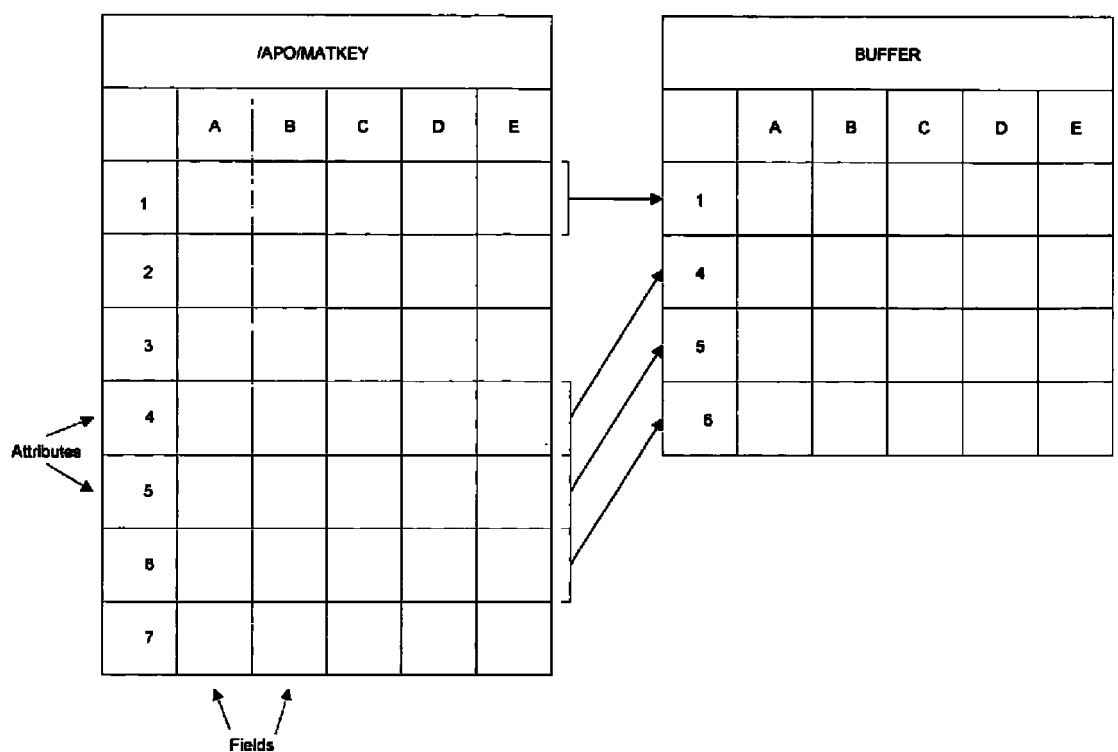
FIG. 2 shows an example of a database and a buffer memory according to the related art.

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

According to an embodiment of the present disclosure, runtime memory allocation is used for buffering by analyzing the application data structures in order to dynamically build application specific selects for data being buffered. For example, the present system first analyzes the application's structure fields and then selects and retrieves only the fields used by the application. Those fields are then stored in local buffer. According to this embodiment of the present disclosure, the number of database round-trips can be reduced thus increasing, performance. In addition, a generic buffer can be used for every object and to store complex (e.g., deep) structures.

Each application has its own view of the data. That is, most applications only need a relatively small subset of fields from the database. According to an embodiment of the present disclosure, a system of field wise selections and buffering are performed to achieve an efficient and robust dynamic data buffer. Embodiments of the present disclosure will now be described by reference to FIGS. 3-5.

Figure 3:
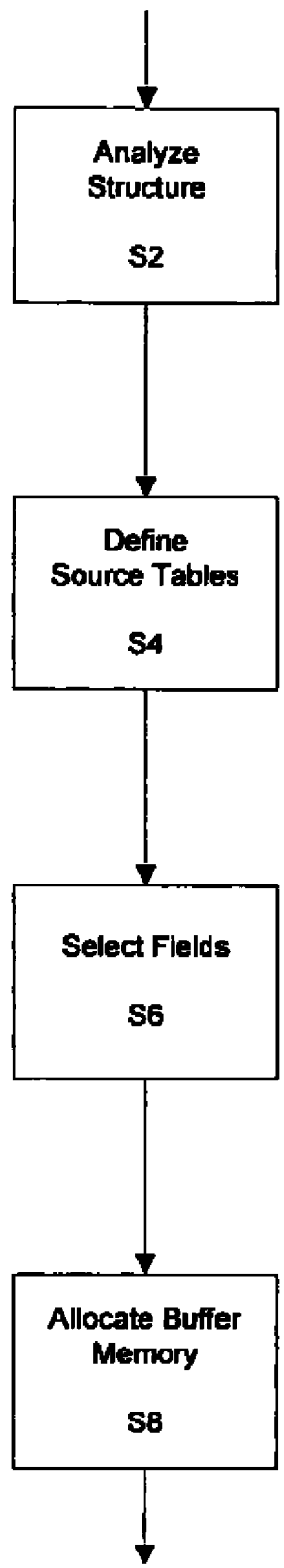
FIG. 3 shows a flow chart for implementing aspects of the present disclosure according to embodiments of the present disclosure.

FIG. 5 shows an example of an application's "view" of the database APO/MATKEY. In this example, only the fields circled are used by the application. That is, the application uses only a subset of all available fields. Referring to FIG. 3, the system first analyzes the application structure (e.g., the structure fields) to determine which fields are used by the application (Step S2). This can be performed, for example, by parsing the application structure to determine exactly which fields of data are being retrieved. In this example, the fields include MATID, MATNR, MEINS. The system then determines the source table(s) (in this example /APO/MATKEY) for these fields (Step S4). The system then performs a field-ise select (Step S6) as follows to retrieve only those fields used by the application:

---

SELECT matid matnr meins
    FROM /apo/matkey
    INTO buffer
    WHERE
        matid IN ("1", "4", "5", "6").

---

The system then performs a dynamic data buffer allocation (Step S8) to allocate buffer memory for the selected fields as follows:

---

BEGIN OF buffer-str,
    Strtype TYPE REF TO typedescr,
    Strdata TYPE REF TO data,
END OF buffer-str.

---

According to the above embodiments of the present disclosure as shown in FIG. 4, by performing dynamic buffer allocation, only the data fields actually being used by the application can be retrieved and stored, saving both time and resources.

Figures 6A, 6B:
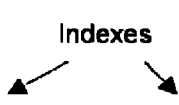
FIGS. 6A and 6B show examples of data mapping/merging and indexes, respectively, for describing aspects of the present disclosure.

According to an embodiment of the present disclosure, the system allows data mapping/merging using a dynamic type creation as shown in FIG. 6A. Using Primary and additional indexes as appropriate (See FIG. 6B) the information in the buffer memory can be readily accessed.

Figure 7A:
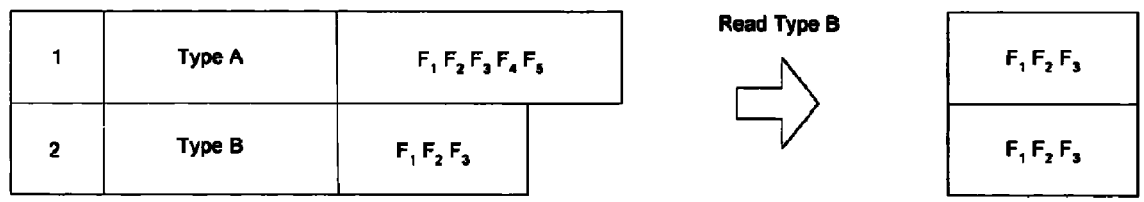
FIGS. 7A and 7B show examples for describing buffer reads and updates, respectively, for describing aspects of the present disclosure.
Figure 7B:
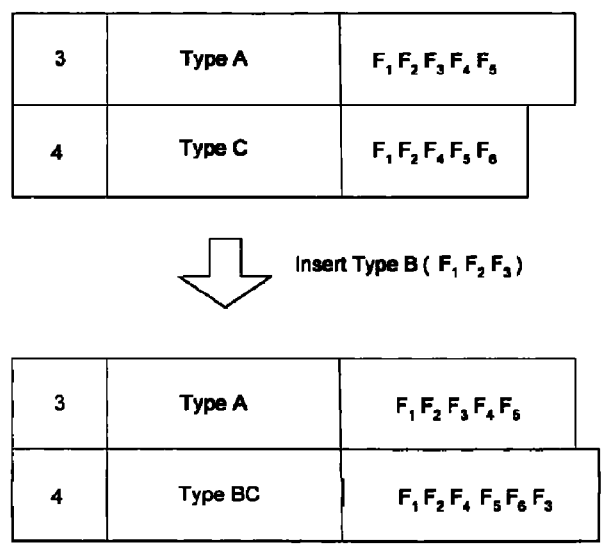

Data call be read from the dynamic buffer memory in several ways. For example, for smaller buffer structures, the system can use a MOVE-CORRESPONDING type instruction to read from the buffer. For the same buffer structure type, the system can use a MOVE type instruction to read from the buffer resulting in a faster read. An example of a same structure type read is shown in FIG. 7A. To update the buffer, the system copies the data into the existing buffer structure for both smaller and same structures. Referring to FIG. 7B, when the attribute sets are different, the system generates new structure with an attributes superset as follows:

--- strtype = Type C U Type B.
CREATE DATA strdata TYPE HANDLE strtype.
MOVE-CORRESPIONDING:
    strC TO strdata,
    strB TO strdata.

Figure 8:
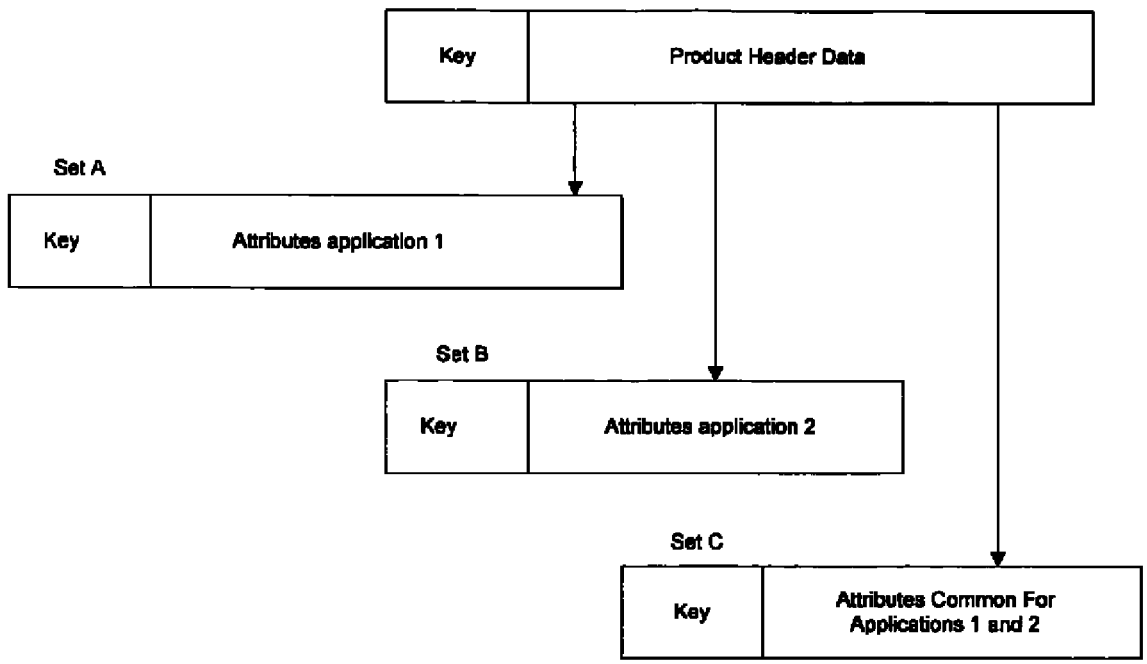
FIG. 8 shows data kept in application-specific sets.

As shown in FIG. 8, data can be kept in attribute sets. For example, for an application request:

---
select MATID, MATNR, MEINS for MATID = "1", "4", "5", "6"
--- the data retrieved can be kept in application specific sets using, for example, select statements as follows:

---
SELECT * FROM SetA
  INTO buffer-SetA
  WHERE matid IN ("1", "4", "5", "6")
SELECT * FROM SetC
  INTO buffer-SetC
  WHERE matid IN ("1", "4", "5", "6")
---

As shown in FIG. 8, the attributes for application 1 are kept in Set A, the attributes for application 2 are kept in Set B and the common attributes for applications 1 and 2 are kept in Set C. Although an attribute set approach uses less memory for buffering, the approach has drawbacks. For example, if the same attributes are needed in two sets, a new set needs to be created. This approach also requires selects to more than one database table.

Figure 9:
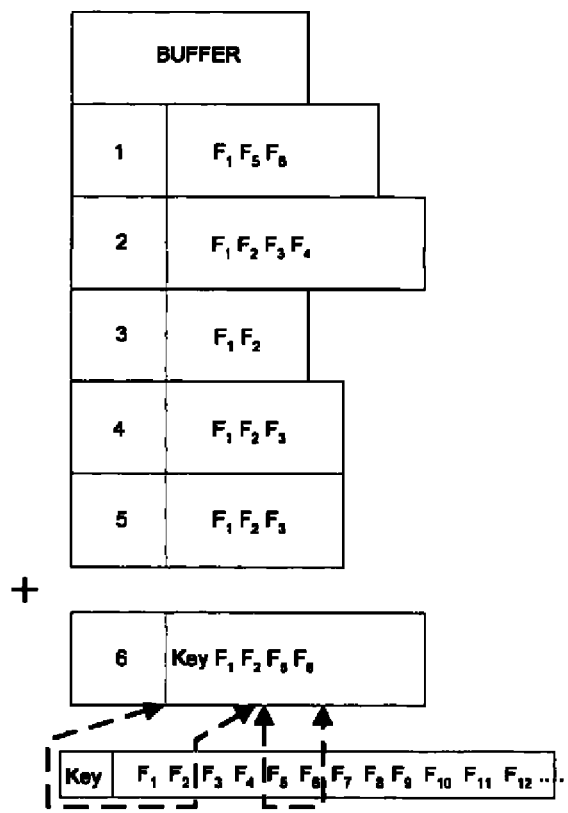
FIG. 9 shows an example of a field-wise database selection and buffering method according to aspects of the present disclosure.

According to an embodiment of the present disclosure, field-wise database selection and buffering is performed to provide an efficient approach to data buffering. For example, for an application request:

---
select MATID, MATNR, MEINS for MATID = "1", "4", "5", "6"
--- field-wise database selection and buffering can be performed as follows and as shown in FIG. 9:

---
SELECT matid matnr meins
  FROM /apo/matkey
  INTO buffer
  WHERE matid IN ("1", "4", "5", "6").
---

As shown in FIG. 9, using this approach, the buffer is thus filled with only attributes used by the application. It is thus possible to use one table instead of fewer smaller tables utilizing this approach. This approach also uses less round trips to obtain the data from the database and uses less memory for the buffered data.

Various embodiments of the present disclosure may make use of Open SQL statements. Of course, aspects of the present disclosure can be implemented utilizing various other types of database access systems.

The present system can be implemented in digital electronic circuitry, or in computer hardware, firmware, software, or in combinations of them. The system can be implemented as a computer program product, i.e., a computer program tangibly embodied in an information cannier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed (across multiple sites and interconnected by a communication network.

Method steps associated with the present system can be performed by one or more programmable processors executing a computer program to perform functions of the invention by operating on input data and generating output. Method steps can also be performed by, and apparatus of the disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices call be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the present disclosure, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The present system has been described in terms of particular embodiments. Other embodiments are within the scope of the following claims. For example, although the present system has been described as a component in a larger system, it can also be implemented in other systems or as a stand-alone system.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A computer implemented dynamic data buffer method, comprising:
   accessing by a processor a database having a plurality of fields of data usable by a plurality of applications;
   analyzing attributes of at least one application's structure from the plurality of applications by parsing the application structure to obtain specific data field names corresponding to specific fields of data in the database used by the at least one application;
   performing, using results of the analyzing, a field-wise select for selecting only the specific fields of data usable by the at least one application corresponding to the specific field names, directly from the plurality of fields of data in the database containing data in data fields usable by a plurality of applications; and
   creating, by the processor, a single dynamic data buffer directly from the database by dynamically creating data types that are accessible using primary and additional indexes from the directly selected fields of data, wherein specific data field names of selected fields are included in more than one of the dynamically created data types, and the single dynamic data buffer includes only the attributes used by the at least one application.

2. The computer implemented dynamic data buffer method as recited in claim 1, wherein the specific fields of data is less than all of the plurality of fields of data usable by the plurality of applications.

3. The computer implemented dynamic data buffer method as recited in claim 1, wherein the creating a dynamic buffer comprises creating one table filled with data only used by the application, wherein the data is read from the one table.

4. The computer implemented dynamic data buffer method as recited in claim 1, wherein the creating a dynamic buffer comprises maintaining data in multiple tables based on attributes of the data.

5. The computer implemented dynamic data buffer method as recited in claim 1, wherein the primary index uses a string type as the index.

6. The computer implemented dynamic data buffer method of claim 1, wherein the creating a dynamic buffer comprises creating the dynamic buffer in a single iteration.

7. A dynamic data buffer system, comprising:
   a data storage device for storing data; and a hardware processor configured to:
   access a database having a plurality of fields of data usable by at least one of the plurality of applications;
   analyze attributes of at least one application's structure from the plurality of applications to obtain specific field names corresponding to specific fields of data in the database used by the at least one application;
   perform, using the results of the analyzing, a field-wise select for selecting only the specific fields of data usable by the at least one application corresponding to the specific field names, directly from the plurality of fields of data in the database containing data in data fields usable by a plurality of applications; and
   create a single dynamic data buffer directly from the database by dynamically creating data types that are accessible using primary and additional indexes from the directly selected fields of data, wherein specific data field names of selected fields are included in more than one of the dynamically created data types, and the single dynamic data buffer includes only the attributes used by the at least one application.

8. The dynamic data buffer system as recited in claim 7, wherein the specific fields of data are less than all of the plurality of fields of data usable by the plurality of applications.

9. The dynamic data buffer system of claim 7, wherein the processor is further configured to create one table filled with data only used by the application, wherein the data is read from the one table.

10. The dynamic data buffer system of claim 7, wherein the processor is further configured to maintain data in multiple tables based on attributes of the data.

11. The dynamic data buffer system of claim 7, wherein the primary index uses a string type as the index.

12. The dynamic data buffer system of claim 7, wherein the creating a dynamic buffer comprises creating the dynamic buffer in a single iteration.

13. A non-transitory computer recording medium including computer executable code, tangibly embodied on the computer recording medium for causing a processor to execute a method for providing a dynamic data buffer, the method comprising:
   accessing a database having a plurality of fields of data usable by a plurality of applications; analyzing attributes of at least one application's structure from the plurality of applications by parsing the application structure to obtain specific field names corresponding to specific fields of data in the database that may be used by the application;
   performing, using the results of the analyzing, a field-wise select for selecting only the specific fields of data usable by the at least one application corresponding to the specific field names, directly from the plurality of fields of data in the database containing data in data fields usable by a plurality of applications; and
   creating a single dynamic data buffer directly from the database in a single iteration by dynamically creating data types that are accessible using primary and additional indexes from the directly selected fields of data, wherein specific data field names of selected fields are included in more than one of the dynamically created data types, and the single dynamic data buffer includes only the attributes used by the at least one application.

14. The non-transitory computer recording medium as recited in claim 13, wherein the specific fields of data are less than all of the plurality of fields of data potentially used by applications.

15. The non-transitory computer recording medium of claim 13, wherein the creating a dynamic buffer comprises creating one table filled with data only used by the application, wherein the data is read from the one table.

16. The non-transitory computer recording medium of claim 13, wherein the creating a dynamic buffer comprises maintaining data in multiple tables based on attributes of the data.

17. The non-transitory computer recording medium of claim 13, wherein the primary index uses a string type as the index.

* * * * *